INVENTORS
ARTHUR E. PEARSON, JR
HERBERT N. HABERSTROH
BY
Christie, Parker & Hale
ATTORNEYS

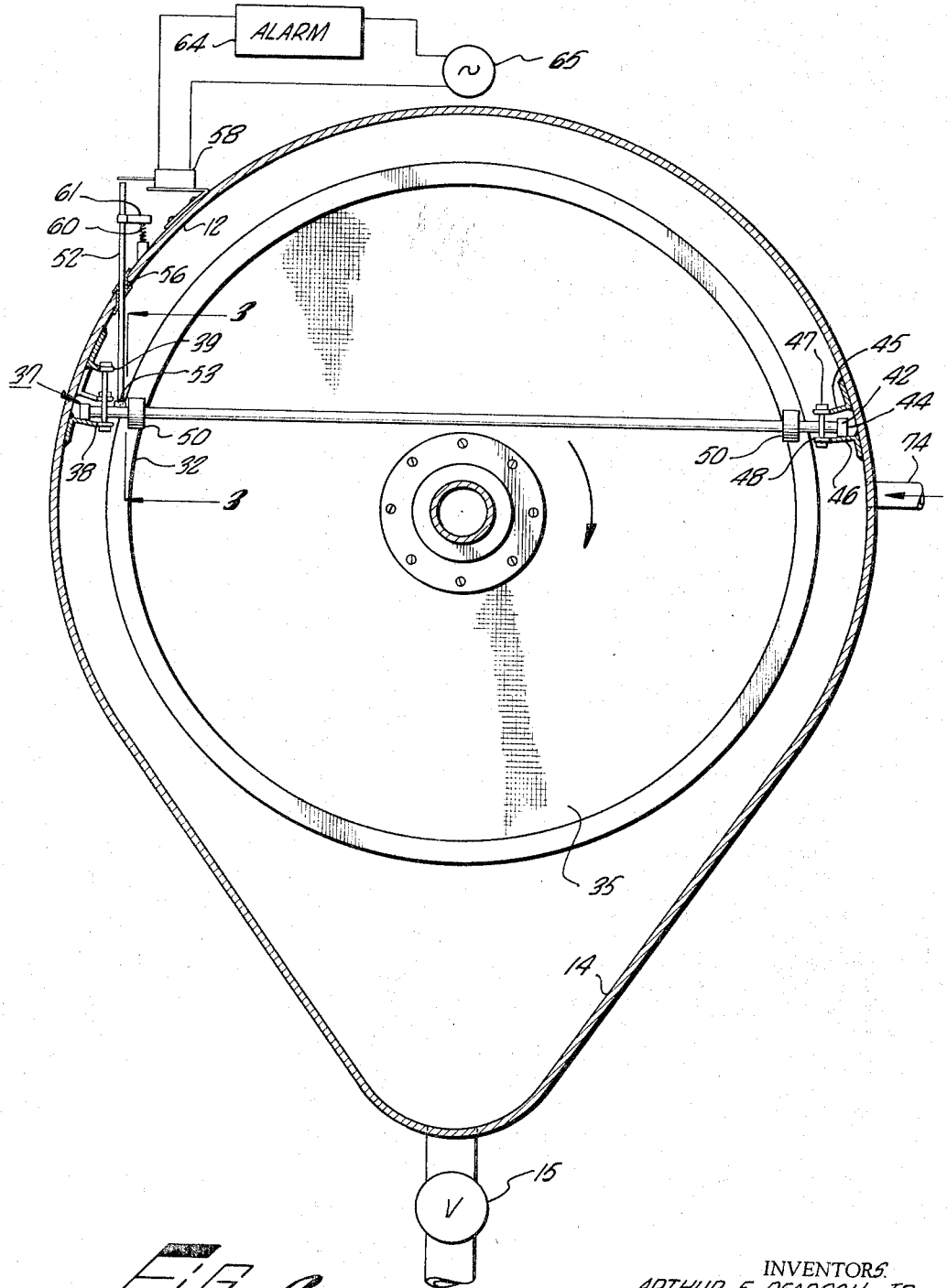
FIG_2

May 30, 1967 A. E. PEARSON, JR., ET AL 3,322,277
METHOD AND APPARATUS FOR FILTERING A LIQUID
CONTAINING CAKE-FORMING SOLIDS
Filed Oct. 29, 1963 3 Sheets-Sheet 3

INVENTORS.
ARTHUR E. PEARSON, JR.
HERBERT N. HABERSTROH
BY
Christie, Parker & Hale
ATTORNEYS.

United States Patent Office 3,322,277
Patented May 30, 1967

3,322,277
METHOD AND APPARATUS FOR FILTERING A LIQUID CONTAINING CAKE-FORMING SOLIDS
Arthur E. Pearson, Jr., Anaheim, Calif., and Herbert N. Haberstroh, Cleveland, Ohio, assignors, by mesne assignments, to Central Hadley Corporation, Los Angeles, Calif.
Filed Oct. 29, 1963, Ser. No. 319,878
2 Claims. (Cl. 210—77)

This invention relates to improvements in filters, and more particularly to improvements in that type of filter wherein a number of leaves are mounted on a tubular shaft within a tank.

In such filters, the liquid to be filtered is introduced into the tank under pressure and is filtered by passing into the filter leaves from which the filtered liquid is discharged through the tubular shaft.

During a filtering run, the suspended solids in the liquid build up a cake on the exterior surfaces of the filter leaves. As the filter cake accumulates, the pressure drop through it to the interior of the leaves increases with the result that increasing inwardly directed forces are applied to the leaves. To maintain proper filtering action, and to protect the leaves from destructive loading, the filtering cycle must be periodically terminated, and the leaves cleaned of the accumulated filter cake.

Past methods for determining the tolerable buildup of filter cake have not been entirely satisfactory. For example, measurements of the differential pressure across the filter cake are subject to wide variations which can give erroneous results.

Another problem with filters of this type is that localized bridging of filter cake occurs between adjacent leaves, and prevents uniform deposition of filter cake over the entire operating surface of the leaves, thereby impairing operating efficiency.

This invention provides method and apparatus for operating a filter to eliminate bridging between adjacent leaves, and to provide a reliable indication of filter cake thickness at the end of the filtering run.

In terms of method for filtering a liquid with cake-forming solids suspended in it, the invention includes disposing a rotatable filter leaf in the liquid with the suspended solids. An antibridging bar is disposed across at least one-half of the face of the filter leaf, closely adjacent the axis of rotation of the leaf. The bar is substantially parallel to and spaced from the face of the leaf a distance equal to the thickness of a filter cake on the face at the end of a filtering run. Liquid is forced into the filtering leaf to build up a filter cake on the face of the leaf underlying the bar. The leaf is rotated relative to the bar while the liquid is forced into the leaf so that substantially all of the face of the leaf sweeps past the bar to prevent the buildup of an undisturbed filter cake of a thickness greater than the distance between the bar and the face of the filter leaf.

Preferably, the bar is disposed substantially equidistant between adjacent filter leaves, and the reaction between the bar and the cake-forming solids disposed on the leaves is sensed to indicate when the filter cakes are of a thickness indicating the end of a filtering run. Conveniently, the leaves are mounted on a rotatable shaft which is turned by an electric motor, or other suitable device, such as an air motor or hydraulic motor, and the power delivered to the motor is sensed to determine when the filter cake is of a thickness substantially equal to the distance between the bar and an adjacent face of a filter leaf.

In terms of apparatus, the improvement provided by this invention includes at least one antibridging bar disposed across at least one-half of one face of a filter leaf in a conventional rotating leaf filter. The bar extends from the periphery of the said leaf to a point closely adjacent the axis of rotation of the leaf so that substantially all of the face of said leaf sweeps past the bar. Means are provided for spacing the bar from the face of the filter leaf a distance substantially equal to the maximum final thickness of the undisturbed filter cake at the end of a filtering run.

Preferably, the antibridging bar is disposed between and across the faces of adjacent filter leaves, and is equidistant from the said faces.

In the presently preferred embodiment, the antibridging bar is an elongated member supported at each end on the interior of the shell to be movable relative to the filter leaves in the direction of the axis of rotation of the shaft on which the leaves are mounted. Rollers are mounted on each bar to engage the periphery of the adjacent leaves and maintain spacing between the bars and the faces of the adjacent leaves a distance substantially equal to the maximum final thickness of the undisturbed filter cake at the end of a filtering run.

An electric motor or other suitable device is used to rotate the shaft, and in one form the invention includes means for sensing the power delivered to the motor to indicate the end of a filtering run.

In another form of the invention, the bar is mounted to be movable in a transverse direction with respect to its longitudinal axis and parallel to the face of the adjacent filter leaf in response to reaction exerted on the bar by the filter cake deposited on an adjacent face of the filter leaf. When the thickness of the filter cake approaches the intended final filter cake thickness at the end of a filtering run, the bar is subjected to sufficient reaction to move and indicate maximum desired loading on the filter leaves.

These and other aspects of the invention will be more fully understood from the following detailed description taken in conjunction with the accompanying drawings, in which:

FIG. 2 is a view taken on line 2—2 of FIG. 1;

Figure 1:
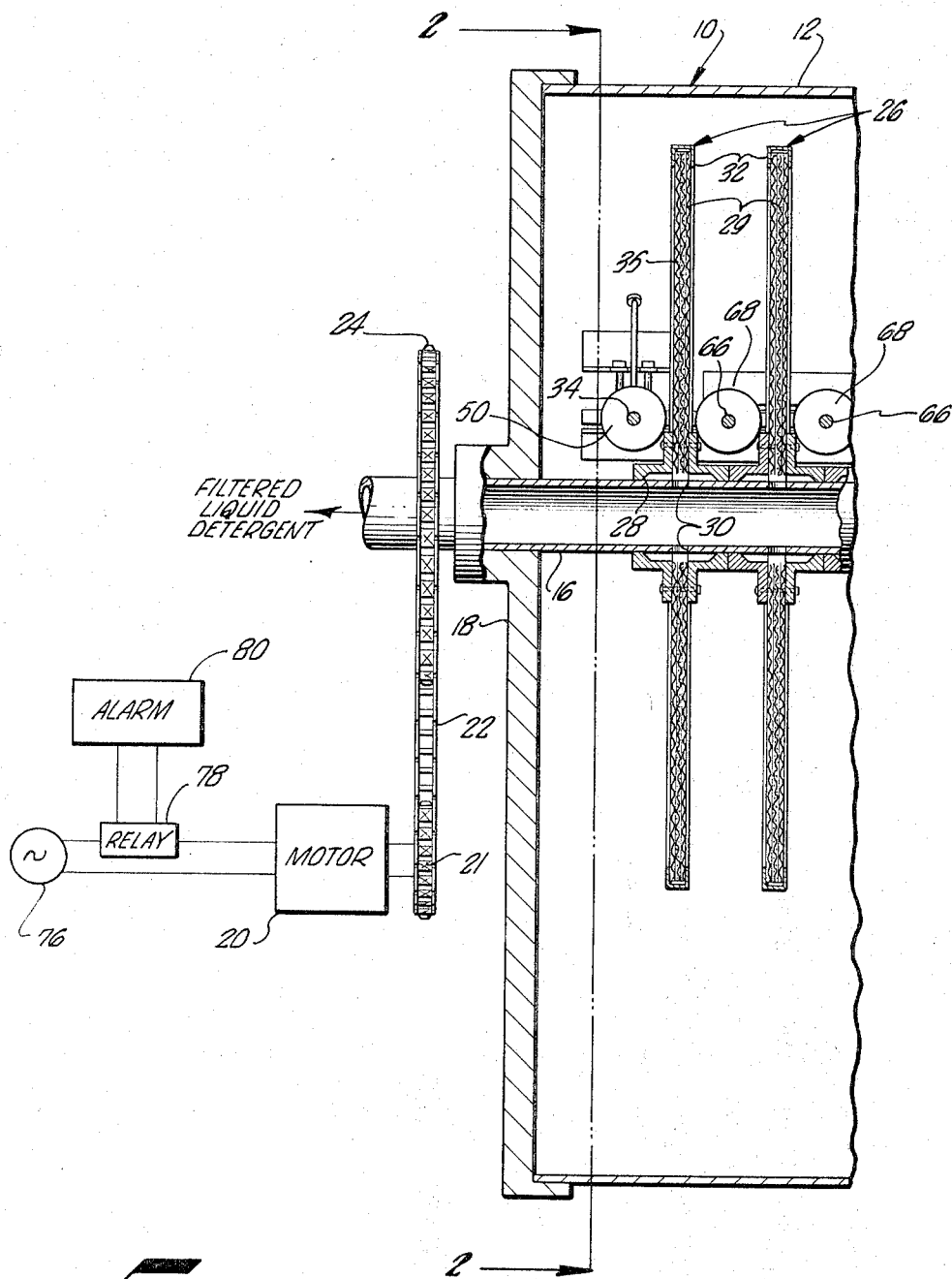
FIG. 1 is a schematic fragmentary sectional elevation of one end of an industrial filter rotating leaf incorporating the antibridging bar and filter cake thickness detector provided by this invention.

Referring to FIGS. 1 and 2, a conventional filter press 10 includes an elongated horizontal and generally cylindrical shell 12 with a trough 14 at its bottom. Discharge valve 15 controls the removal of filter cake from the shell. An elongated horizontal and hollow rotatable shaft 16 is journaled through end plates 18 which close opposite ends of the shell. The hollow shaft is rotated by an electric motor 20 which turns a driving sprocket 21 which, in turn, drives a chain 22 that rotates a driven sprocket 24 rigidly secured to the hollow shaft.

A plurality of conventional disk-shaped filter leaves 26 are each secured by respective central hubs 28 to the shaft and are forced to rotate with the shaft by conventional keying (not shown). As shown best in FIG. 1, the filter leaf includes a porous permeable core 29, say of wire mesh or other suitable material, which opens into the hub for the leaf and communicates with the interior of the hollow shaft through ports 30 in the shaft and underlying the hub. Conventional filter aid precoats (not shown) may be applied to the porous surface of the leaf filters to provide a deposit medium for cake-forming solids to be filtered from suspension in a liquid (not shown) disposed within the shell. Each filter leaf includes an annular rim 32 to provide rigid support for the filters at their peripheries.

A first elongated horizontal antibridging bar 34 is disposed across the outer face 35 of the first filter leaf mounted on the left (as viewed in FIG. 1) end of the hollow shaft. As shown best in FIGS. 2 and 3, the left (as viewed in FIG. 2) end of the horizontal shaft carries an elongation rectangular transverse block 36 which rests in a horizontal and inwardly opening channel 37 formed between an upper inwardly extending flange 38 and a lower inwardly extending flange 39. The block 36 is relatively short and the upper and lower flanges extend for substantially the entire length of the shell interior. The block 36 normally rests on the lower flange 39, and the antibridging bar 34 is disposed between a pair of vertical bolts 40, each mounted in a respective pair of upper and lower U-shaped keepers 41 welded to the first upper flange and the lower flange. The antibridging bar 34 extends horizontally across the shell to pass closely adjacent the hub of the filter leaf so that its intermediate portion is close to the axis of rotation of the leaf. Thus, as the leaf rotates, say in a clockwise direction as viewed in FIG. 2, substantially all of its surface area sweeps past the antibridging bar, and the left end of the bar is free to move upwardly for a limited distance in the channel formed by flanges 38 and 39.

The right (as viewed in FIG. 2) end of the antibridging bar 34 carries a transverse elongated rectangular block 42 which rests in a channel 44 formed between an upper flange 45 and a lower flange 46 which are each welded to the interior of the shell to extend inwardly. Flanges 45 and 46 extend longitudinally for substantially the entire length of the shell, and are vertically spaced by a distance only slightly greater than the height of the block. The right end of the bar is restrained from excessive longitudinal movement by bolts 47 disposed through U-shaped keepers 48 as described with the left end of the antibridging bar.

A separate roller 50 is mounted adjacent each end of the antibridging bar to make a light sliding engagement with the rim of the outer face of the filter leaf. Thus, the roller, bolts, and U-shaped keepers keep the antibridging bar substantially parallel to the outer face of the filter leaf and spaced a distance from the filter leaf equal to the thickness of the undisturbed filter cake at the end of a filtering run.

The lower end of a vertical push rod 52 is spherical and rests on the upper portion of the left end of the first antibridging bar 34 between a pair of vertical guide plates 53, 54 welded to the top of the antibridging bar. The push rod makes a sliding seal through a packing gland 56 in the shell, and its upper end is disposed to actuate a limit switch 58 mounted on the exterior of the shell when the rod moves upwardly from the position shown in FIG. 2. A vertical tension spring 60 is secured at its lower end to the shell exterior and at its upper end to a projection 61 rigidly attached to the push rod. Thus, the push rod is urged down into firm contact with the upper surface of the left end of the first antibridging bar. As explained in detail below, when the filter cake builds up on the surface of the filter leaf adjacent the first antibridging bar to an undisturbed depth equal to the spacing between the bar and the filter leaf face, the left (as viewed in FIG. 2) end of the bar is forced upwardly due to the reaction of the bar against the filter cake. The limit switch 58 is actuated and an alarm 64 is energized through a power source 65. If desired, the alarm can be set to shut off automatically the motor which drives the shaft 16. In any event, the actuation of the alarm indicates the end of a filtering run.

Additional separate antibridging bars 66 are mounted between adjacent filter leaves in a manner similar to that described for the first antibridging bar. If desired, each additional bar supports a separate respective push rod (not shown for simplicity) to indicate filter cake build-up by actuating separate respective alarm systems (not shown). Rollers 68 on the additional antibridging bars make light sliding contact with the rims on the peripheries on the adjacent leaves and insure proper spacing of the bars from their respective leaves. As seen best in FIG. 1, the antibridging bars between adjacent leaves are positioned by the rollers 68 to be equidistant from adjacent leaves.

Figure 4:
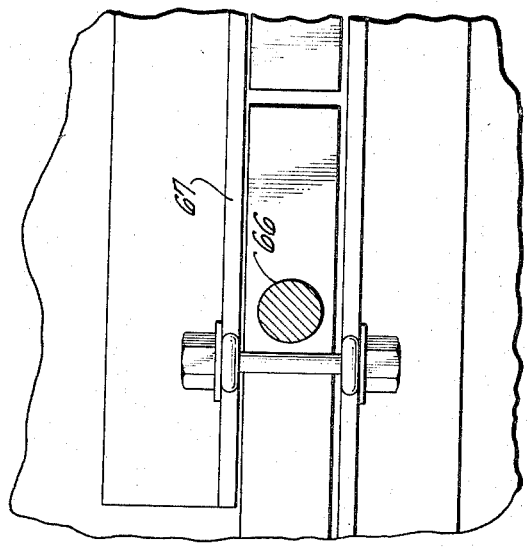
FIG. 4 is a view similar to FIG. 3 of an alternate embodiment of the invention.

In the alternate embodiment shown in FIG. 4, separate antibridging bars 66 are mounted between adjacent filter leaves in a manner similar to that described for the first antibridging bar. However, the transverse blocks at opposite ends of each antibridging bar 66 make relatively close fits in their channels as described with respect to the right (as viewed in FIG. 2) end of the first antibridging bar. For example, an upper inwardly extending flange 67 is mounted on the interior of the shell over the lower flange 39. In this case, the vertical push rods are omitted.

Liquid with suspended solids is introduced into the shell through an inlet pipe 74 (FIG. 2) under operating pressure supplied by a pump (not shown).

Referring to FIG. 1, a source of electrical power 76 is connected through a relay 78 to the motor 20. As an alternative to sensing the final thickness of the filter cake with the push rod, the relay is set to energize an alarm 80 when the electrical power delivered to the motor reaches that required when the filter cakes on the filter leaves have built up to final undisturbed thicknesses substantially equal to the spacing of the antibridging bars from the adjacent faces of the filter leaves.

In operation, the apparatus is assembled as shown and liquid to be filtered is introduced into inlet pipe 74. The shell fills with the liquid, and the hollow shaft is rotated relatively slowly. Liquid under pressure is forced through the filter leaves, and filtered liquid is withdrawn from the hollow rotatable shaft.

As filtering proceeds, a filter cake starts to build up on the exterior faces of the filter leaves. If the filter cake tends to build up faster in one area than in others to a depth exceeding the spacing set by the antibridging bar, the cake is leveled by sweeping past the adjacent respective antibridging bar. In this way, bridging of filter cakes between adjacent filter leaves is prevented, and a disk-shaped annular channel is kept open between adjacent filter leaves during the entire filtering operation to insure maximum efficiency.

With the arrangement shown in FIG. 4, as the filter cakes on the leaves approach an undisturbed thickness equal to the distance between the antibridging bar and an adjacent leaf, the load on the motor increases sharply causing it to draw an abnormal amount of power and thereby actuate the relay 78 to sound an alarm 80. The The operator then knows that the filtering cycle is to be stopped.

Figure 3:
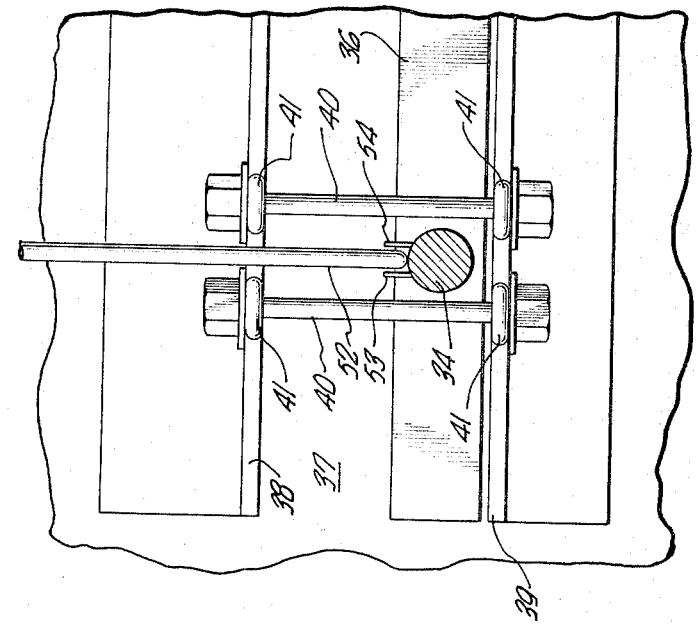
FIG. 3 is a view taken on line 3—3 of FIG. 2.

Alternatively, in the arrangement shown in FIG. 3, the reaction of the filter cake on the antibridging bars is sufficiently strong that the left (as viewed in FIG. 2) end of each bar is forced upwardly to operate its respective limit switch 58, which actuates alarm 64 to indicate the end of a filtering run.

The introduction of liquid into the shell is terminated, the filter cake is removed from the filter leaves by conventional operations, and dropped to the sump in the bottom of the shell. The dislodged filter cake is then removed out the discharge line by sluicing or other conventional means. The shell is now ready for another filtering run.

We claim:

1. A method for filtering a liquid with cake-forming solids suspended in it, the method comprising disposing a rotatable filter leaf in the liquid with the suspended solids, disposing an antibridging bar across at least one face of the filter leaf, the bar extending from the periphery of the leaf to a point closely adjacent the axis of rotation of the leaf, the bar being substantially parallel to and spaced from the said face of the leaf a distance equal to the desired thickness of a filter cake on the face at the end of a filtering run, forcing liquid into the filter leaf to build up a filter cake on the said face of the leaf, rotating the leaf relative to the bar with an electric motor while the liquid is forced into the leaf so that substantially all of the said face of the leaf sweeps past the bar to prevent the buildup of an undisturbed filter cake of a thickness greater than the distance between said face and the bar, and sensing the power delivered to the motor to determine when the filter cake is of a thickness substantially equal to the distance between the bar and the said face of the leaf.

2. In apparatus for filtering a liquid with cake-forming solids suspended in it, the apparatus including filter leaves disposed within a shell and mounted on a rotatable shaft to be spaced from each other and rotate with the shaft, an electric motor connected to rotate the shaft, and means for forcing liquid into the filter leaves to form filter cakes having a maximum final undisturbed thickness at the end of a filtering run, the improvement which comprises at least one antibridging bar disposed across at least one face of one of the filter leaves to extend from the periphery of the said leaf to a point closely adjacent the axis of rotation of the leaf so that substantially all of the said face of the said leaf sweeps past the bar, means spacing the bar from the said face a distance substantially equal to the maximum final thickness of the undisturbed filter cake at the end of a filtering run, and means for sensing the power delivered to the motor to indicate the end of a filtering run.

References Cited

UNITED STATES PATENTS

| | | | |
|---|---|---|---|
| 1,042,295 | 10/1912 | Trent | 210—327 |
| 1,313,929 | 8/1919 | Sweetland | 210—91 X |
| 2,621,798 | 12/1952 | Kracklauer | 210—327 |
| 2,799,397 | 7/1957 | Berline | 210—86 X |
| 3,077,988 | 2/1963 | Anderson et al. | 210—86 |

REUBEN FRIEDMAN, *Primary Examiner.*

J. DE CESARE, *Assistant Examiner.*